(12) United States Patent
Cuozzo

(10) Patent No.: US 6,778,074 B1
(45) Date of Patent: Aug. 17, 2004

(54) SPEED LIMIT INDICATOR AND METHOD FOR DISPLAYING SPEED AND THE RELEVANT SPEED LIMIT

(76) Inventor: Giuseppe A. Cuozzo, 17 Maple St., Bloomfield, NJ (US) 07003

( * ) Notice: Subject to any disclaimer, the term of this patent is extended or adjusted under 35 U.S.C. 154(b) by 114 days.

(21) Appl. No.: 10/100,378

(22) Filed: Mar. 18, 2002

(51) Int. Cl.[7] ................................................. B60Q 1/00
(52) U.S. Cl. ........................ 340/441; 340/905; 340/988
(58) Field of Search ................................. 340/441, 905, 340/438, 901, 988; 701/117, 119, 202

(56) References Cited

U.S. PATENT DOCUMENTS

| | | | | |
|---|---|---|---|---|
| 4,315,295 A | * | 2/1982 | Zocholl ........................ 361/96 |
| D270,339 S | * | 8/1983 | Boleis ......................... D10/125 |
| 4,935,850 A | * | 6/1990 | Smith, Jr. ..................... 362/27 |
| 5,485,161 A | * | 1/1996 | Vaughn ................... 342/357.13 |
| 5,680,306 A | * | 10/1997 | Shin et al. .................... 180/167 |
| 5,819,198 A | * | 10/1998 | Peretz ......................... 701/117 |
| D411,122 S | * | 6/1999 | Velazquez .................... D10/98 |
| 5,995,895 A | * | 11/1999 | Watt et al. ..................... 701/50 |
| 6,134,499 A | * | 10/2000 | Goode et al. ................. 701/93 |
| 6,161,072 A | * | 12/2000 | Clapper ........................ 701/93 |
| 6,265,989 B1 | * | 7/2001 | Taylor ......................... 340/901 |
| 6,515,596 B2 | * | 2/2003 | Awada ........................ 340/905 |

* cited by examiner

*Primary Examiner*—Nina Tong

(57) ABSTRACT

Speed limit indicators and methods for determining speed, the relevant speed limit, and displaying same make it easy for the driver of a vehicle to compare his current speed with the legal limit for the location in which he is traveling. This eliminates the need for the driver to take his eyes off the road to look for speed limit signs, thereby reducing the chance of an accident, and resolves any confusion that might exist as to what the current legal limit is. An audible warning of excessive speed reduces the amount of time the driver needs to spend examining the speedometer.

20 Claims, 3 Drawing Sheets

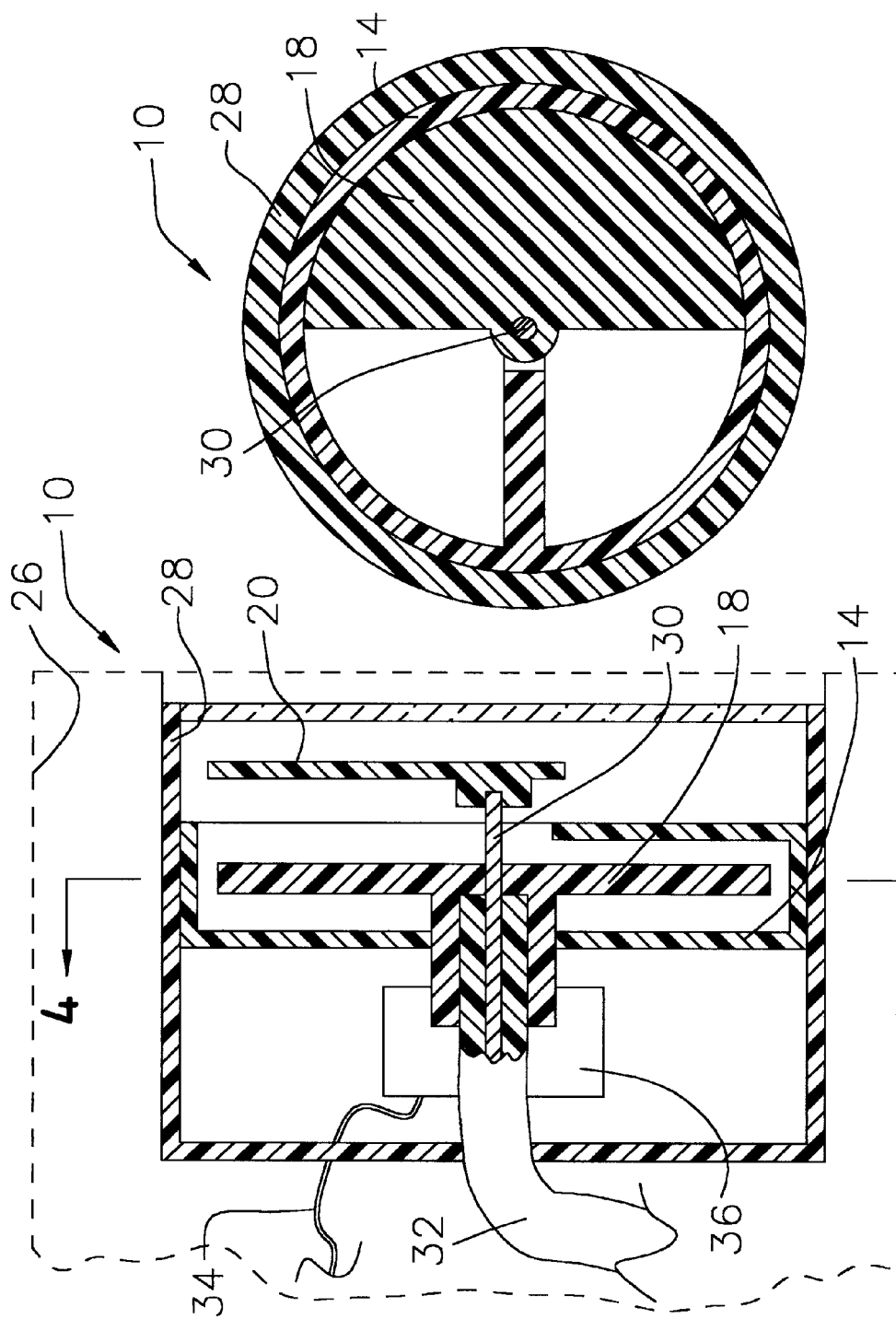

SPEED LIMIT INDICATOR AND METHOD FOR DISPLAYING SPEED AND THE RELEVANT SPEED LIMIT

BACKGROUND OF THE INVENTION

1. Field of the Invention

The present invention relates to a speed limit indicator and method for displaying speed and the relevant speed limit for use in connection with vehicles. The speed limit indicator and method for displaying speed and the relevant speed limit has particular utility in connection with displaying the current speed of a vehicle and how it relates to the legal speed limit for the current location in which the vehicle is traveling.

2. Description of the Prior Art

Speed limit indicators and methods for determining speed, the relevant speed limit, and displaying same are desirable for making it easy for the driver of a vehicle to compare his current speed with the legal limit for the location in which he is traveling. This eliminates the need for the driver to take his eyes off the road to look for speed limit signs, and resolves any confusion that might exist as to what the current legal speed limit is. An audible warning of excessive speed reduces the amount of time the driver needs to spend examining the speedometer. By allowing the driver to keep his eyes on the road more of the time, the speed limit indicator reduces the chance of an accident.

The use of speed regulators is known in the prior art. For example, U.S. Pat. No. 5,485,161 to Vaughn discloses a vehicle speed control based on GPS/MAP matching of posted speeds. However, the Vaughn '161 patent does not display the current speed limit, and has further drawbacks of not allowing the driver to speed in the event of an emergency, potentially creating a more dangerous situation.

U.S. Pat. No. 5,315,295 to Fujii discloses a vehicle speed control system that decelerates a vehicle during a turn. However, the Fujii '295 patent does not display the current speed limit, and additionally does not provide an audible notification to the driver when the speed limit is being exceeded under all situations.

Similarly, U.S. Pat. No. 6,134,499 to Goode et al. discloses a road speed control system for a vehicle driven by an internal combustion engine that controls engine speed with transmission gear speed. However, the Goode et al. '499 patent does not display the current speed limit, and cannot audibly notify the driver when the speed limit is being exceeded.

Additionally, U.S. Pat. No. 5,680,306 to Shin et al. discloses a system, and method for enabling a vehicle to track a path that positions and navigates an autonomous vehicle. However, the Shin et al. '306 patent does not display the current speed limit, and has the additional deficiency of not audibly notifying the driver when the speed limit is being exceeded.

Furthermore, U.S. Pat. No. 5,995,895 to Watt et al. discloses a control of vehicular systems in response to anticipated conditions predicted using predetermined geo-referenced maps. However, the Watt et al. '895 patent does not display the current speed limit, and has the additional deficiency of not audibly notifying the driver when the speed limit is being exceeded.

In addition, U.S. Pat. No. Des. 270,339 to Boleis discloses a display plate for an electronic navigation aid. However, the Boleis '339 patent does not display the current speed limit, and does not audibly notify the driver when the speed limit is being exceeded. Lastly, U.S. Pat. No. Des. 411,122 to Velazquez discloses a vehicle speed limiting controller. However, the Velazquez '122 patent does not display the current speed limit, and has the additional deficiency of not audibly notifying the driver when the speed limit is being exceeded.

While the above-described devices fulfill their respective, particular objectives and requirements, the aforementioned patents do not describe a speed limit indicator and method for displaying speed and the relevant speed limit that allows displaying the current speed of a vehicle and how it relates to the legal speed limit for the current location in which the vehicle is traveling. The above patents make no provision for displaying the current speed limit to the driver. They also do not audibly notify the driver when the speed limit is being exceeded.

Therefore, a need exists for a new and improved speed limit indicator and method for displaying speed and the relevant speed limit that can be used for displaying the current speed of a vehicle and how it relates to the legal speed limit for the current location in which the vehicle is traveling. In this regard, the present invention substantially fulfills this need. In this respect, the speed limit indicator and method for displaying speed and the relevant speed limit according to the present invention substantially departs from the conventional concepts and designs of the prior art, and in doing so provides an apparatus primarily developed for the purpose of displaying the current speed of a vehicle and how it relates to the legal speed limit for the current location in which the vehicle is traveling.

SUMMARY OF THE INVENTION

In view of the foregoing disadvantages inherent in the known types of speed regulators now present in the prior art, the present invention provides an improved speed limit indicator and method for displaying speed and the relevant speed limit, and overcomes the above-mentioned disadvantages and drawbacks of the prior art. As such, the general purpose of the present invention, which will be described subsequently in greater detail, is to provide a new and improved speed limit indicator and method for displaying speed and the relevant speed limit for displaying the current speed of a vehicle and how it relates to the legal speed limit for the current location in which the vehicle is traveling which has all the advantages of the prior art mentioned heretofore and many novel features that result in a speed limit indicator and method for displaying speed and the relevant speed limit which is not anticipated, rendered obvious, suggested, or even implied by the prior art, either alone or in any combination thereof.

To attain this, the present invention essentially comprises a speed limit indicator comprising a speed limit display and an attached speedometer.

Also, the invention comprises a method of determining speed, the relevant speed limit, and displaying same, which comprises the steps of: upload current information to regional speed limit database, determine the vehicle's location and speed using a global positioning system receiver, obtain the speed limit for the vehicle's current location from the database, compare the vehicle's speed to the speed limit, generate a tone if the vehicle is speeding, send the speed limit to the display control unit, and modify the speed limit display to reflect which speeds are below the speed limit and which speeds exceed the speed limit.

There has thus been outlined, rather broadly, the more important features of the invention in order that the detailed description thereof that follows may be better understood and in order that the present contribution to the art may be better appreciated.

The invention may also include a color display comprising the speed limit indicator which may take the form of a colored filter or a liquid crystal display. The speedometer may have a needle and speed denoting markings. There are, of course, additional features of the invention that will be described hereinafter and which will form the subject matter of the claims attached.

Numerous objects, features and advantages of the present invention will be readily apparent to those of ordinary skill in the art upon a reading of the following detailed description of presently current, but nonetheless illustrative, embodiments of the present invention when taken in conjunction with the accompanying drawings. In this respect, before explaining the current embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved speed limit indicator and method for displaying speed and the relevant speed limit that has all of the advantages of the prior art speed regulators and none of the disadvantages.

It is another object of the present invention to provide a new and improved speed limit indicator and method for displaying speed and the relevant speed limit that may be easily and efficiently manufactured and marketed.

An even further object of the present invention is to provide a new and improved speed limit indicator and method for displaying speed and the relevant speed limit that has a low cost of manufacture with regard to both materials and labor, and which accordingly is then susceptible of low prices of sale to the consuming public, thereby making such speed limit indicator and method for displaying speed and the relevant speed limit economically available to the buying public.

Still another object of the present invention is to provide a new speed limit indicator and method for displaying speed and the relevant speed limit that provides in the apparatuses and methods of the prior art some of the advantages thereof, while simultaneously overcoming some of the disadvantages normally associated therewith.

Even still another object of the present invention is to provide a speed limit indicator and method for displaying speed and the relevant speed limit for displaying the current speed of a vehicle and how it relates to the legal speed limit for the current location in which the vehicle is traveling. This allows the driver to always be aware of the current legal speed limit.

Still yet another object of the present invention is to provide a speed limit indicator and method for displaying speed and the relevant speed limit for displaying the current speed of a vehicle and how it relates to the legal speed limit for the current location in which the vehicle is traveling. This makes it possible to automatically notify the driver if he is speeding without requiring him to remove his eyes from the road.

A further object of the present invention is to provide a speed limit indicator and method for displaying speed and the relevant speed limit for displaying the current speed of a vehicle and how it relates to the legal speed limit for the current location in which the vehicle is traveling. This permits the driver to keep his eyes on the road instead of looking for speed limit signs and checking his speed on the speedometer, thereby reducing the chance of an accident.

An additional object of the present invention is to provide a speed limit indicator and method for displaying speed and the relevant speed limit for displaying the current speed of a vehicle and how it relates to the legal speed limit for the current location in which the vehicle is traveling. This makes it possible to maintain a current database of locations and their speed limits.

Lastly, it is an object of the present invention to provide a new and improved speed limit indicator and method for displaying speed and the relevant speed limit for displaying the current speed of a vehicle and how it relates to the legal speed limit for the current location in which the vehicle is traveling.

These together with other objects of the invention, along with the various features of novelty that characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated current embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3 is a side sectional view of the speed limit indicator and method for displaying speed and the relevant speed limit of the present invention.

FIG. 4 is a top sectional view of the speed limit indicator and method for displaying speed and the relevant speed limit of the present invention.

The same reference numerals refer to the same parts throughout the various figures.

DESCRIPTION OF THE CURRENT EMBODIMENT

Figure 1:
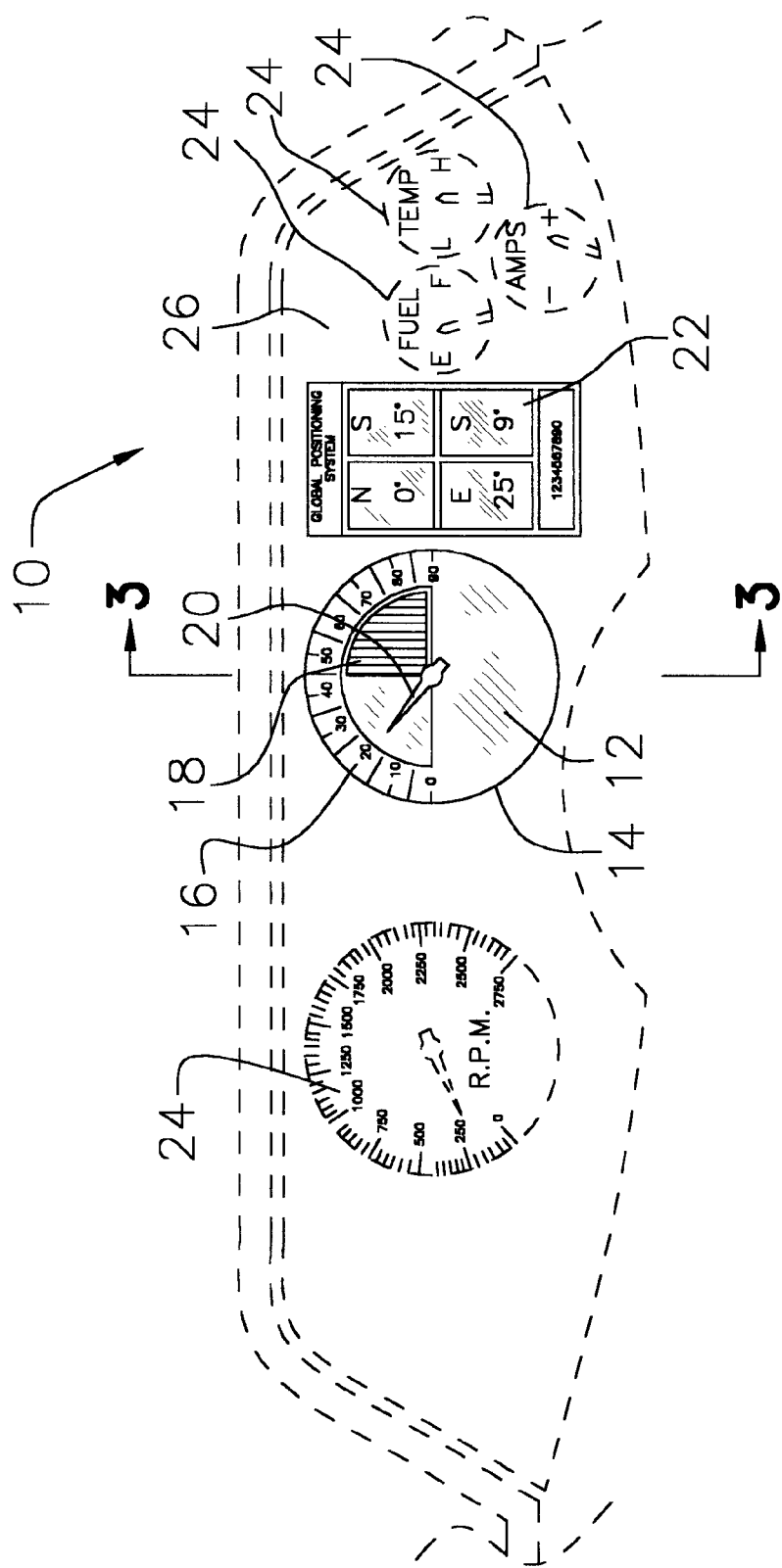
FIG. 1 is a top view of the current embodiment of the speed limit indicator and method for displaying speed and the relevant speed limit constructed in accordance with the principles of ID the present invention.

Referring now to the drawings, and particularly to FIGS. 1–4, a current embodiment of the speed limit indicator and method for displaying speed and the relevant speed limit of the present invention is shown and generally designated by the reference numeral 10.

In FIG. 1, a new and improved speed limit indicator and method for displaying speed and the relevant speed limit 10 of the present invention for displaying the current speed of a vehicle and how it relates to the legal speed limit for the current location in which the vehicle is traveling is illustrated and will be described. More particularly, the speed limit indicator and method for displaying speed and the relevant speed limit 10 has a speedometer 12 mounted on a dashboard 26. Speedometer 12 has a backplate 14 made of plastic, speed denoting markings 16 painted on backplate 14, a colored display 18 made of a red plastic filter, and a plastic needle 20 rotatably mounted in the center of backplate 14. A global positioning receiver 22 is positioned adjacent to speedometer 12. Other gauges 24 typically present on a dashboard 26 are shown. Note that the broken lines illustrating gauges 24 and dashboard 26 are for illustrative purposes only and are not part of the current invention.

Figure 2:
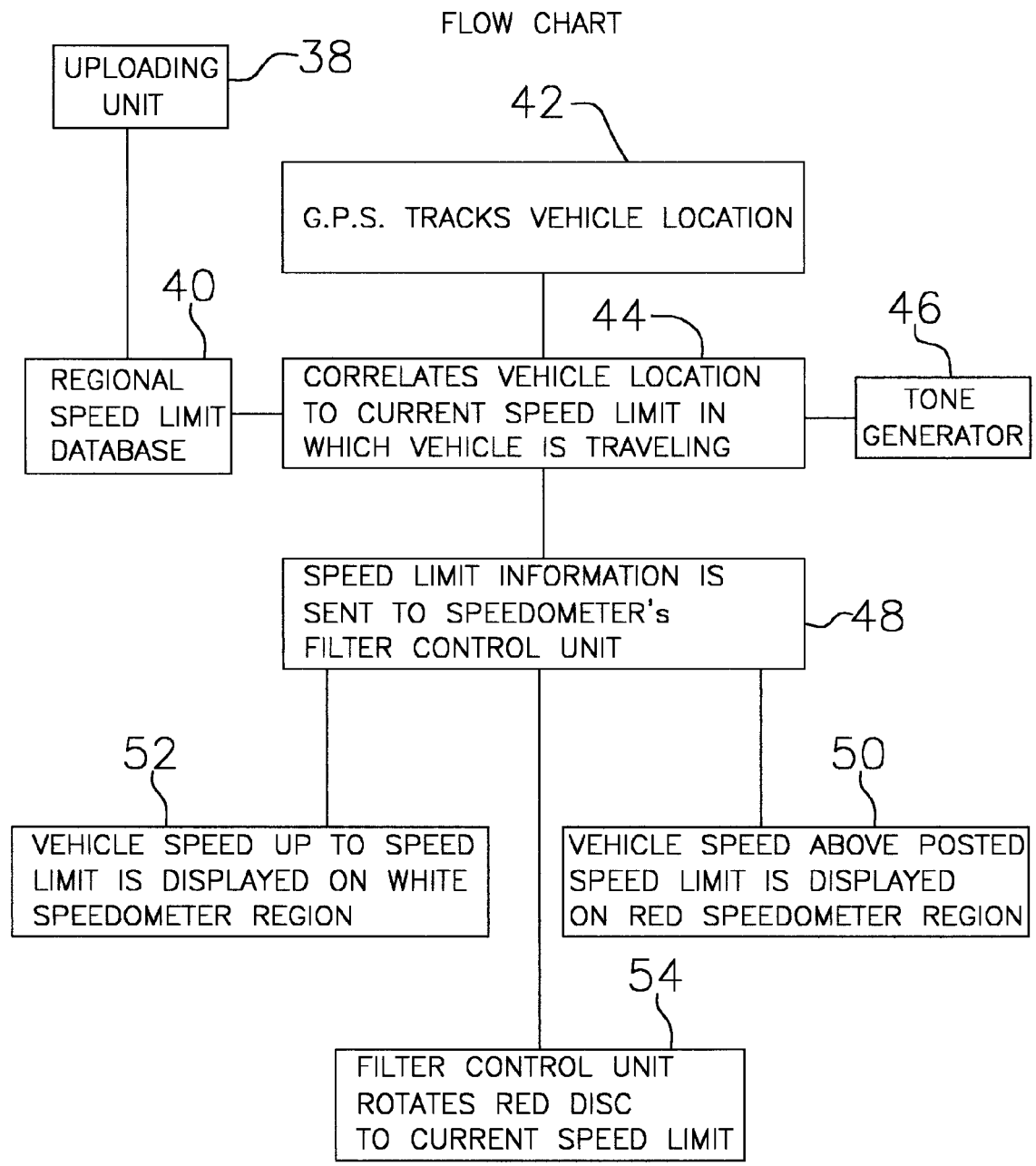
FIG. 2 is a block diagram of the speed limit indicator and method for displaying speed and the relevant speed limit of the present invention.

Moving on to FIG. 2, a new and improved speed limit indicator and method for displaying speed and the relevant speed limit 10 of the present invention for displaying the current speed of a vehicle and how it relates to the legal speed limit for the current location in which the vehicle is traveling is illustrated and will be described. More particularly, the method for displaying speed and the relevant speed limit has the following steps. Uploading unit 38 uploads current data to a regional speed limit database 40. The global positioning system receiver 42 tracks the vehicle's location and speed, and identifies the relevant speed limit from the database for that location. The global positioning system receiver compares the vehicle's speed and the relevant speed limit 44, and uses a tone generator 46 to generate a tone in the event that the vehicle's speed exceeds the relevant speed limit. The speed limit information is sent from the global positioning system receiver to a filter control unit 48. The control unit adjusts the colored filter so that the speeds above the legal speed limit are displayed in red 50 while the legal speeds are displayed in white 52. This is accomplished by the control unit rotating the red filter disc 54 to the appropriate degree.

Continuing with FIG. 3, a new and improved speed limit indicator and method for displaying speed and the relevant speed limit 10 of the present invention for displaying the current speed of a vehicle and how it relates to the legal speed limit for the current location in which the vehicle is traveling is illustrated and will be described. More particularly, the speed limit indicator and method for displaying speed and the relevant speed limit 10 has a housing 28 containing backplate 14, colored display 18, axle 30, needle 20, and display controller 36. The housing 28 is contained within dashboard 26. Wire 34 connects to display controller 36, and speedometer cable 32 connects to axle 30.

Lastly, in FIG. 4, a new and improved speed limit indicator and method for displaying speed and the relevant speed limit 10 of the present invention for displaying the current speed of a vehicle and how it relates to the legal speed limit for the current location in which the vehicle is traveling is illustrated and will be described. More particularly, the speed limit indicator and method for displaying speed and the relevant speed limit 10 has a backplate 14, colored display 18, housing 28, and axle 30.

While a current embodiment of the speed limit indicator and method for displaying speed and the relevant speed limit has been described in detail, it should be apparent that modifications and variations thereto are possible, all of which fall within the true spirit and scope of the invention. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention. For example, any location determining device such as an inertial navigation system may be used instead of the global positioning system receiver described. Also, the plastic components of the speedometer could be made from any suitable material such as metal. And although a red filter disc has been described, it should be appreciated that the colored display herein described could also take the form of a liquid crystal display.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A speed limit indicator comprising:
    a colored display to delineate which speed readings are in violation of the speed limit at a vehicle's current location;
    a speedometer integrally attached to said colored display; and
    a display controller connected to said colored display, wherein said display controller adjusts said colored display independently of said speedometer to continuously update the delineation of which speed readings are in violation of the speed limit at a vehicle's present location.

2. The speed limit indicator as defined in claim 1, wherein said colored display is a liquid crystal display.

3. The speed limit indicator as defined in claim 1, wherein said colored display is a colored filter.

4. The speed limit indicator as defined in claim 1, wherein said speedometer comprises:
    a needle;
    an axle having opposing ends with one end attached to said needle; and
    a speedometer cable having opposing ends with one end attached to said axle.

5. The speed limit indicator as defined in claim 4, wherein said speedometer further comprises:
    a backplate;
    plurality of speed denoting markings affixed to said backplate; and
    a housing enclosing said backplate.

6. The speed limit indicator as defined in claim 1, wherein said speedometer comprises a liquid crystal display.

7. The speed limit indicator as defined in claim 1, further comprising:
    an electrically conductive wire having opposing ends with one end connected to said display controller; and
    a speed limit locating device connected to said opposing end of said wire.

8. The speed limit indicator as defined in claim 7, wherein said speed limit locating device comprises:
    a global positioning receiver; and
    a database of locations and their corresponding speed limits which is accessible by said display controller.

9. The speed limit indicator as defined in claim 1, wherein said display controller further comprises a tone generator.

10. A speed limit indicator comprising:

a global positioning system receiver;

a display controller connected to said global positioning system receiver, wherein said display controller adjusts a colored display in response to signals from said global positioning system receiver to continuously update the delineation of which speed readings are in violation of the speed limit at a vehicle's present location; and a speedometer integrally attached to said colored display.

11. The speed limit indicator as defined in claim 10, wherein said global positioning system receiver further comprises a database of locations and their corresponding speed limits.

12. The speed limit indicator as defined in claim 10, wherein said colored display is a liquid crystal display.

13. The speed limit indicator as defined in claim 12, wherein said display controller adjusts said liquid crystal display independently of said speedometer to continuously update the delineation of which speed readings are in violation of the speed limit at a vehicle's present location.

14. The speed limit indicator as defined in claim 10, wherein said colored display is a colored filter.

15. The speed limit indicator as defined in claim 14, wherein said speedometer comprises:

a needle;

an axle having opposing ends with one end attached to said needle; and a speedometer cable having opposing ends with one end attached to said axle.

16. The seed limit indicator as defined in claim 15, wherein said speedometer further comprises:

a backplate;

a plurality of speed denoting markings affixed to said backplate; and a housing enclosing said backplate.

17. The speed limit indicator as defined in claim 14, wherein said display controller rotates said colored filter independently of said speedometer to continuously update the delineation of which speed readings are in violation of the speed limit at a vehicle's present location.

18. The speed limit indicator as defined in claim 10, wherein said speedometer comprises a liquid crystal display.

19. The speed limit indicator as defined in claim 10, wherein said display controller further comprises a tone generator.

20. A method of determining speed, the relevant speed limit, and displaying same, which comprises the steps of:

uploading current information to regional speed limit database;

determining vehicle location and speed;

obtaining speed limit for said vehicle location from said database;

comparing vehicle speed to said speed limit;

generating tone if said vehicle speed exceeds said speed limit;

sending speed limit to display control unit; and modifying the limit indicator as defined in claim 1 to reflect which speeds are below said speed limit and which speeds exceed said speed limit.

* * * * *